United States Patent
Liao

(10) Patent No.: US 8,050,633 B2
(45) Date of Patent: Nov. 1, 2011

(54) WIRELESS COMMUNICATION SYSTEM

(75) Inventor: Yude Liao, Hsinchu (TW)

(73) Assignee: Ralink Technology Corp., Hsinchu (TW)

( * ) Notice: Subject to any disclaimer, the term of this patent is extended or adjusted under 35 U.S.C. 154(b) by 397 days.

(21) Appl. No.: 12/391,369

(22) Filed: Feb. 24, 2009

(65) Prior Publication Data
US 2009/0264083 A1   Oct. 22, 2009

(30) Foreign Application Priority Data

Apr. 21, 2008   (TW) .............................. 97114439 A

(51) Int. Cl.
*H04B 1/44* (2006.01)
(52) U.S. Cl. ........................................... 455/73; 455/78
(58) Field of Classification Search ...................... 455/73
See application file for complete search history.

(56) References Cited

U.S. PATENT DOCUMENTS

| | | | | |
|---|---|---|---|---|
| 6,728,517 B2 * | 4/2004 | Sugar et al. | ...................... | 455/73 |
| 7,450,911 B1 * | 11/2008 | Venkatesh | ........................ | 455/73 |
| 7,471,930 B2 * | 12/2008 | Okuyama et al. | ............... | 455/78 |
| 7,865,149 B2 * | 1/2011 | Han et al. | ........................ | 455/73 |
| 7,885,609 B2 * | 2/2011 | Yu | ................................... | 455/73 |

* cited by examiner

*Primary Examiner* — Hai L Nguyen
(74) *Attorney, Agent, or Firm* — Pearne & Gordon LLP

(57) ABSTRACT

A wireless communication system is disclosed. The present invention mainly includes a transceiver, a first filter unit, a second filter unit, and a first amplifying unit, wherein the first filter unit is a harmonic oscillation circuit having an inductive component and a capacitive component serially coupled to each other, and the harmonic oscillation circuit as well as the circuit of the second filter unit efficiently filter out a local oscillation frequency signal and intermediate frequency signal traveling along with a radio frequency signal, thereby preventing neighboring communication systems from electro-magnetic interference due to radiation of the local oscillation frequency signal and intermediate frequency signal into air via an antenna after being amplified by the first amplifying unit.

6 Claims, 2 Drawing Sheets

WIRELESS COMMUNICATION SYSTEM

BACKGROUND OF THE INVENTION

1. Field of the Invention

This invention relates generally to a wireless communication system, and more particularly, to a wireless communication system that is capable of effectively suppressing electromagnetic interference.

2. Description of Related Art

The application scope of wireless communication systems continues to broaden, encompassing such devices as mobile phones, cordless phones, wireless local area networks, wireless headsets and so on.

As shown in FIG. 1, a radio frequency circuit architectural diagram of a prior communication system comprises: a transceiver 10, a band pass filter (BPF) 11, a power amplifier (PA) 12, a low noise amplifier (LNA) 13, a switcher 14, and an antenna 15. In transmitting mode, after a local oscillation frequency signal LO and an intermediate frequency signal IF are mixed inside the transceiver 10 to generate a radio frequency signal RF to be sent, the radio frequency signal RF undergoes first a filter process through the band pass filter 11 for filtering out noise, and then undergoes an amplifying process through the amplifier 12, and subsequently is radiated into air via the antenna 15 after passing through the switcher 14. In receiving mode, a radio frequency signal RF in air is received via the antenna 15, and the received radio frequency is then sent to the low noise amplifier 13 through the switcher 14, and subsequently the received RF signal is processed through the low noise amplifier 13 and then passed to the transceiver 10.

As shown in FIG. 1, the band pass filter 11 is located just before the power amplifier 12 for suppressing the LO and IF signals emitted from the transceiver 10. However, due to design restriction on the oscillator inside the transceiver 10 for generating the LO and IF signals, the band pass filter 11 needs high suppression capability to filter out the LO and IF signals emitted from the transceiver 10. In addition, in the wireless communication system, the response of the band pass filter is affected by external impedance, thereby creating various cut-off effects and thereby being incapable of effectively filtering out the LO and IF signals emitted from the transceiver 10. Consequently, the LO signal and the IF signal traveling along with the RF signal to be radiated are sent into the power amplifier 12 and are amplified and then undesirably radiated via the antenna 15, thus forming electro-magnetic interference (EMI). It further affects wireless communication systems that utilize frequencies corresponding to the LO and IF signals. Accordingly, the wireless communication industry is adopting approaches such as decreasing the emissive power, applying absorbing material, and so on to reduce EMI; however, these prior approaches result in not only higher costs but also greater application difficulties.

SUMMARY OF THE INVENTION

In view of the disadvantages of the prior art mentioned above, it is a primary objective of the present invention to provide a wireless communication system that suppresses electro-magnetic interference generated while the system is sending out the desired radio frequency signal To achieve the above-mentioned and other objectives, a wireless communication system is provided according to the present invention, which comprises: a transceiver, the transceiver having a transmitting end a receiving end and being used to perform a frequency mixing process on a local oscillation frequency signal and an intermediate frequency signal to produce the final radio frequency signal to be broadcast, and then sending out the radio frequency signal via the transmitting end, and also the transceiver being for receiving an external radio frequency signal via the receiving end; a first filter unit coupled to the transmitting end, the first filter unit being for performing a filtering process on the radio frequency signal sent out from the transceiver and generating a first processed signal; a second filter unit coupled to the first filter unit, the second filter unit being for receiving the first processed signal sent out from the first filter unit, and then performing a filtering process on the first processed signal and generating a second processed signal; a first amplifying unit coupled to the second filter unit, the first amplifying unit being for receiving the second processed signal sent out from the second filter unit, and then amplifying the second processed signal to generate and output a third processed signal.

Preferably, the first filter unit is a harmonic oscillation circuit having an inductive component and a capacitive component serially coupled to each other, one end of the first filter being coupled with the transmitting end of the transceiver and the second filter unit, the other end of the first filter being grounded; the second filter unit is a band pass filter; and the first amplifying unit is a power amplifier. The wireless communication system of the present invention further comprises a second amplifying unit, the second amplifier being a low noise power amplifier.

In view of the above, the wireless communication system of the present invention is characterized by allocating a harmonic oscillation circuit formed with a capacitive component and an inductive component serially coupled to each other, between a band pass filter and the transceiver, thereby improving the cut-off efficiency of the band pass filter. Additionally, the harmonic oscillation circuit is capable of suppressing the local oscillation frequency signal and the intermediate frequency signal emitted from the transceiver, as well as unwanted harmonic signals of the desired radio frequency signal to be sent, thereby improving the non-linear aspects of the system, and further avoiding the aforementioned drawback that exists in the prior art, wherein, traveling along with the radio frequency signal, the local oscillation frequency signal and the intermediate frequency signal also enter into the power amplifier and are subsequently amplified, thus causing electro-magnetic interference after being radiated into air via the antenna. In addition, the present invention does not need to decrease the emissive power or apply absorbing material to reducing EMI. Instead, EMI is reduced simply by utilizing a harmonic oscillation circuit formed with an inductive component and a capacitive component serially coupled to each other just before the band pass filter, thereby decreasing system design cost as well as providing a correspondingly easier application.

BRIEF DESCRIPTION OF DRAWINGS

The present invention can be more fully understood by reading the following detailed description of the preferred embodiments, with reference made to the accompanying drawings, wherein.

DETAILED DESCRIPTION OF PREFERRED EMBODIMENTS

The following illustrative embodiments are provided to illustrate the disclosure of the present invention. Those in the art can readily understand these and other advantages and effects after reading the disclosure of this specification. The present invention can also be performed or applied by differing embodiments. The details of the specification may be changed on the basis of different points and applications, and numerous modifications and variations can be devised without departing from the spirit of the present invention.

Figure 1:
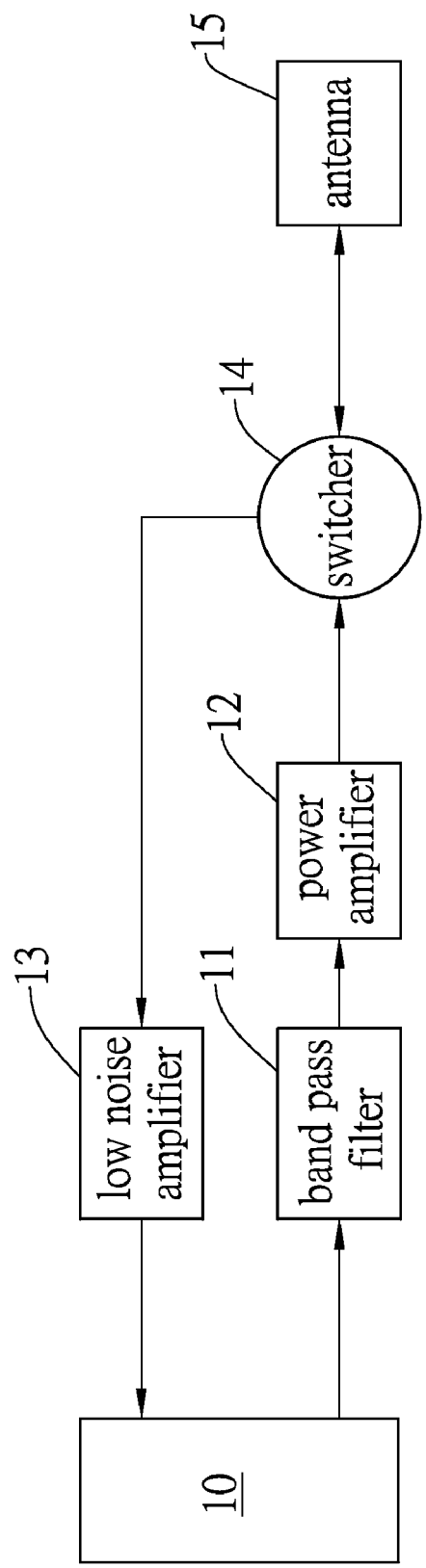
FIG. 1 is a basic architectural diagram of a prior art wireless communication system.
Figure 2:
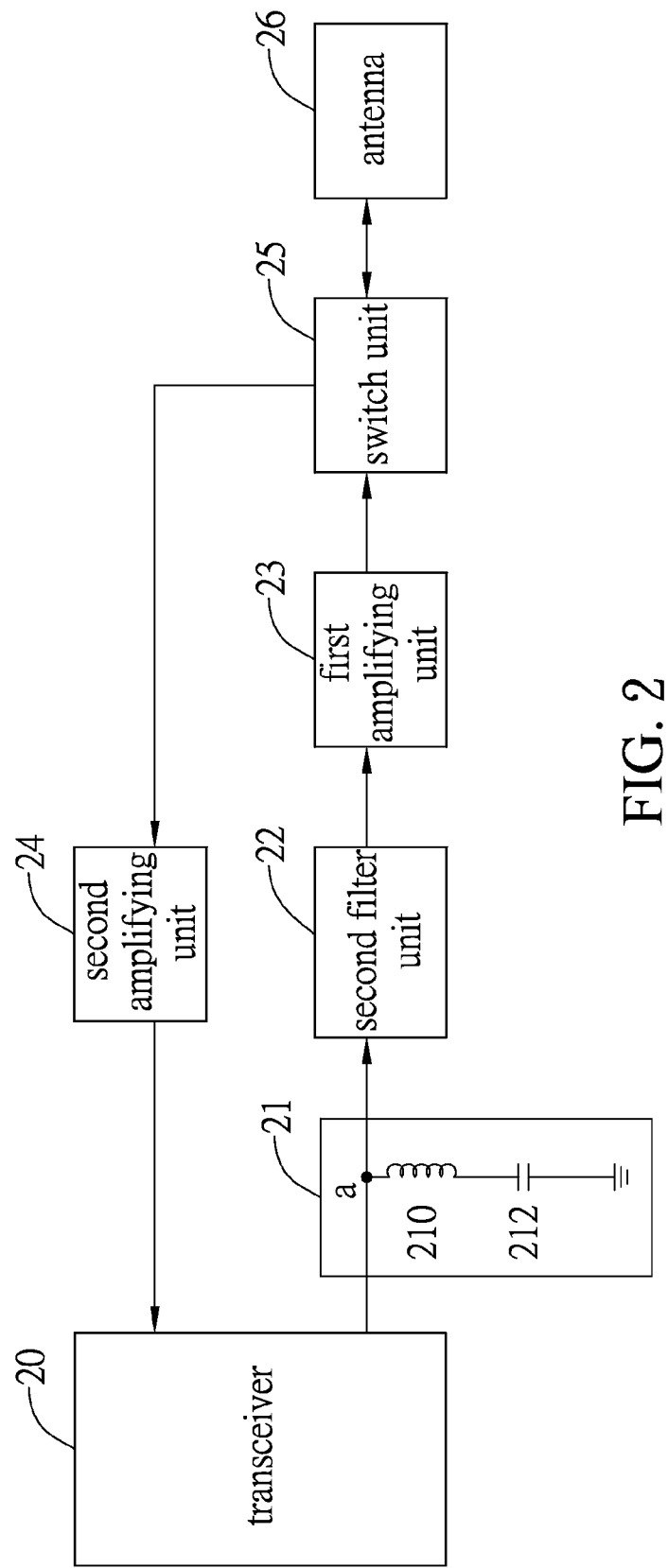
FIG. 2 is a basic architectural diagram illustrating a wireless communication system of the present invention.

Please refer to FIG. 2, which is a basic architectural diagram illustrating the wireless communication system of the present invention. As shown in the figure, the wireless communication system comprises: a transceiver 20, a first filter unit 21, a second filter unit 22, a first amplifying unit 23, a second amplifying unit 24, a switch unit 25, and an antenna 26. Detailed descriptions of the wireless communication system of the present invention follow.

The transceiver 20 is for performing a frequency-mixing process on a local oscillation frequency signal LO and an intermediate frequency signal IF to produce the radio signal RF to be radiated, and then outputting said radio signal RF to be radiated via the transmitting end TX of the transceiver 20. Also, the transceiver 20 is for receiving an external radio frequency signal via the receiving end thereof. More specifically, the transceiver 20 of the present invention is for converting a digital signal to be sent into a mock signal, and then adjusting the mock signal via reference signals, i.e. the local oscillation frequency signal and the intermediate frequency signal, and then operating a frequency mixing process to produce the radio frequency signal RF to be radiated. In addition, the transceiver 20 is capable of receiving an external radio frequency signal via the receiving end RX thereof, and then processing said received radio frequency signal to acquire a desired message signal.

The first filter unit 21 coupled to the transmitting end TX, is for performing a filtering process on the radio signal RF sent out from the transceiver 20, and then generating and outputting a first processed signal S1.

In the present invention, the first filter unit 21 is a LC harmonic oscillation circuit having an inductive component 210 and a capacitive component 212 serially coupled to each other. As shown in the figure, one end a of the inductive component 210 is coupled with the transmitting end TX of the transceiver 20 and the input end of the second filter unit 22, the other end of the inductive component 210 being coupled with one end of the capacitive component 212. The other end of the capacitive component 21 is grounded. The LC harmonic oscillation circuit is capable of effectively improving the cut-off efficiency of the cut-off region of the second filter unit 22. In addition, the LC harmonic oscillation circuit is capable of effectively suppressing the LO signal and the IF signal emitted from the transceiver 20, as well as harmonic signals of the desired RF signal. It is especially effective against the 2× harmonic frequency of the LO signal and 3× harmonic frequency of the RF signal, thereby further decreasing the non-linear aspects of the system. The radio frequency signal RF output from the transceiver 20 undergoes a first filtering process through the LC harmonic oscillation circuit of the first filter unit 21 to form the first processed signal S1, and the first processed signal S1 is then output to the input end of the second filter unit 22 via the end marked 'a' of the inductive component 210 shown in FIG. 2.

The second filter unit 22, which is, for example, a band pass filter, is for performing a further filtering process on the first processed signal S1 output from the first filter unit 21 and generating a second processed signal S2. In the present invention, the combination of the LC harmonic oscillation circuit and the band pass filter enables the LO signal and IF signal traveling along with the radio frequency signal RF to be filtered out effectively, thereby avoiding electro-magnetic interference caused by unintended radiation of the LO signal and the IF signal into air via the antenna 26 after being subsequently amplified by the first amplifying unit 23.

The first amplifying unit 23, which is, for example, a power amplifier, is for performing an amplifying process on the second processed signal S2 output from the second filter unit 22 to produce and output a third processed signal S3.

The switch unit 25 coupled with the first amplifying unit 23, the second amplifying unit 24, and the antenna 26 is for performing a receiving/sending switching process, thereby enabling the wireless communication system to either receive or send signals depending on the desired mode of operation.

The antenna 26 is for radiating the third processed signal S3 through the switch unit 25 into air after being output from the first amplifying unit 23. Also, the antenna 26 is for receiving radio frequency signal RF' from air, the radio frequency signal RF' being input into the second amplifying unit 24 through the switch unit 25.

The second amplifying unit 24, which is, for example, a low noise power amplifier LNA, is for performing an amplifying process on the received radio frequency signal RF', and then outputting the processed radio frequency signal to the receiving end RX of the transceiver 20. The low noise power amplifier LNA constituted by the second amplifying unit 24 is for performing the amplifying process on the received radio frequency signal RF' to compensate for cable loss between the antenna 26 and the LNA, and is also for minimizing the noise index of receiver of the transceiver 20.

In view of the above, the wireless communication system of the present invention is mainly characterized by allocating a harmonic oscillation circuit having an inductive component and a capacitive component serially coupled to each other between a band pass filter and a transceiver, thereby being capable of improving the cut-off efficiency of the band pass filter. Also, the harmonic oscillation circuit enables the wireless communication system to effectively suppress the local oscillation frequency signal and the intermediate frequency signal emitted from the transceiver as well as harmonic signals of radio frequency signal to be sent, thereby improving the non-linear aspects of the system, and further avoiding the drawback that exists with the prior art, wherein electro-magnetic interference is formed due to radiation of the local oscillation frequency and intermediate frequency signals, which enter into the power amplifier along with the radio frequency signal, and then into air via the antenna after being amplified by the power amplifier. In addition, EMI reduction approaches, such as decreasing the emissive power or applying absorbing material, adopted in the prior art are not needed. By strategically allocating and selecting the harmonic oscillation circuit formed with an inductive component and capacitive component serially coupled to each other, to the front of the band pass filter, the system design cost is reduced and also application of the system is simplified.

The foregoing descriptions of the detailed embodiments are illustrated to disclose the features and functions of the present invention and are not intended to be restrictive of the scope of the present invention. It should be understood to those in the art that various modifications and variations performed according to the spirit and principles in the disclosure of the present invention fall within the scope of the appended claims.

What is claimed is:

1. A wireless communication system, comprising:
a transceiver having a transmitting end and a receiving end;
a first filter unit coupled to the transmitting end for filtering a radio frequency signal sent out from the transceiver and generating a first processed signal;
a second filter unit coupled to the first filter unit for filtering the first processed signal and generating a second processed signal; and
a first amplifying unit coupled to the second filter unit for amplifying the second processed signal to generate a third processed signal,
wherein the first filter unit is a harmonic oscillation circuit that comprises an inductive component and a capacitive component, and the inductive component and the capacitive component are serially coupled, and
wherein one end of the inductive component is coupled with the transmitting end and an input end of the second filter unit, the other end of the inductive component is coupled with one end of the capacitive component, and the other end of the capacitive component is grounded.

2. The wireless communication system of claim 1, wherein the second filter unit is a band pass filter.

3. The wireless communication system of claim 1, wherein the first amplifying unit is a power amplifier.

4. The wireless communication system of claim 1, wherein the transceiver is configured for performing a frequency mixing process on local oscillation frequency signals and intermediate frequency signals to generate a radio frequency signal and outputting the radio frequency signal via the transmitting end and receiving an external radio frequency signal via the receiving end.

5. The wireless communication system of claim 1, further comprising:
a switch unit for switching between the transmitting end and the receiving end;
an antenna for radiating the third processed signal from the switch unit into a channel and receiving a radio frequency signal from the channel; and
a second amplifying unit for processing the radio frequency signal received by the antenna, and outputting a processed radio frequency signal to the receiving end of the transceiver.

6. The wireless communication system of claim 5, wherein the second amplifying unit is a low noise power amplifier.

* * * * *